(12) United States Patent
Park et al.

(10) Patent No.: US 9,528,613 B2
(45) Date of Patent: Dec. 27, 2016

(54) VALVE FOR CONTROLLING COOLANT FUEL CELL STACK COOLANT OF FUEL CELL VEHICLE

(71) Applicants: Hyundai Motor Company, Seoul (KR); Kia Motors Corporation, Seoul (KR)

(72) Inventors: Hun Woo Park, Gyeonggi-do (KR); Sung Wook Na, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 130 days.

(21) Appl. No.: 14/479,983

(22) Filed: Sep. 8, 2014

(65) Prior Publication Data

US 2015/0184759 A1   Jul. 2, 2015

(30) Foreign Application Priority Data

Dec. 30, 2013  (KR) .................. 10-2013-0167030

(51) Int. Cl.
    *F16K 3/24*   (2006.01)
    *F16K 41/00*  (2006.01)
    *F16K 41/08*  (2006.01)

(52) U.S. Cl.
    CPC ............. *F16K 3/243* (2013.01); *F16K 41/003* (2013.01); *F16K 41/083* (2013.01); *Y02E 60/50* (2013.01)

(58) Field of Classification Search
    CPC ........ F16K 3/243; F16K 41/083; F16K 41/03; Y02E 60/50

USPC .................. 251/214, 175; 429/436; 277/560
See application file for complete search history.

(56) References Cited

U.S. PATENT DOCUMENTS

| | | | | |
|---|---|---|---|---|
| 3,199,876 A | * | 8/1965 | Magos | .................. F16J 15/181 |
| | | | | 251/355 |
| 3,455,564 A | * | 7/1969 | Dega | ...................... F16J 15/322 |
| | | | | 277/559 |
| 3,606,353 A | * | 9/1971 | Heinl | ................... F16J 15/3244 |
| | | | | 277/559 |
| 4,531,747 A | * | 7/1985 | Miura | ................... F16J 15/164 |
| | | | | 277/552 |
| 4,541,612 A | * | 9/1985 | Yohner | .................. F16B 21/16 |
| | | | | 137/315.23 |

(Continued)

FOREIGN PATENT DOCUMENTS

| JP | 2003-336746 A | 11/2003 |
|---|---|---|
| KR | 10-2009-0058095 | 6/2009 |

(Continued)

*Primary Examiner* — John Bastianelli
(74) *Attorney, Agent, or Firm* — Mintz Levin Cohn Ferris Glovsky and Popeo, P.C.; Peter F. Corless

(57) ABSTRACT

A valve for controlling the temperature of a coolant to flow into a fuel cell stack to provide the optimum level of coolant at the appropriate temperature in order to keep the operation of the fuel cell stack stable is provided. In particular, new type of seal that can achieve maximum sealability with minimized friction force on a plunger shaft by changing the shape and structure of a seal for sealing the plunger shaft. As such, the valve provides a coolant control valve for a fuel cell stack in a fuel cell vehicle which can improve durability in addition to preventing water leakage and can contribute to reducing the manufacturing cost via reduction of the number or parts and simplification of the structure by removing peripheral parts all while sufficiently sealing the valve.

5 Claims, 3 Drawing Sheets

(56) References Cited

U.S. PATENT DOCUMENTS

| | | | | |
|---|---|---|---|---|
| 4,550,920 | A | * | 11/1985 | Matsushima ........ F16J 15/3232 277/559 |
| 4,658,847 | A | * | 4/1987 | McCrone ................ E06B 5/164 137/72 |
| 4,747,605 | A | * | 5/1988 | Antonini .............. F16J 15/3216 277/558 |
| 5,234,194 | A | * | 8/1993 | Smith ................... F16K 5/0285 251/214 |
| 5,244,183 | A | * | 9/1993 | Calvin ................... F16J 15/004 137/312 |
| RE35,309 | E | * | 8/1996 | Matsushima ....... F16C 33/7813 277/351 |
| 5,645,283 | A | * | 7/1997 | Drucktenhengst ..... F16J 15/324 277/568 |
| 5,649,709 | A | * | 7/1997 | Munekata ............ F16J 15/3232 277/560 |
| 5,759,466 | A | * | 6/1998 | Onuma ................. F16J 15/328 264/138 |
| 6,045,138 | A | * | 4/2000 | Kanzaki ................ F16J 15/324 277/560 |
| 6,161,834 | A | * | 12/2000 | Pollack .................. E21B 17/05 277/300 |
| 6,322,082 | B1 | * | 11/2001 | Paykin .................. F16J 15/322 277/549 |
| 6,726,211 | B1 | * | 4/2004 | Kuroki ................ F16J 15/3244 277/353 |
| 7,648,144 | B2 | * | 1/2010 | Sanada ................ F16J 15/3216 277/551 |
| 7,790,325 | B2 | | 9/2010 | Shioya et al. |
| 8,016,293 | B2 | * | 9/2011 | Voydatch ............... F16J 15/164 277/551 |
| 2002/0096218 | A1 | * | 7/2002 | Mefford ................ F16J 15/004 137/557 |
| 2009/0072173 | A1 | * | 3/2009 | Hasunuma ................ F16K 7/12 251/129.12 |
| 2009/0208795 | A1 | * | 8/2009 | Skala ............... H01M 8/04029 429/423 |
| 2009/0317676 | A1 | * | 12/2009 | Andreas-Schott .. F16K 11/0525 429/423 |
| 2010/0126598 | A1 | * | 5/2010 | Peric ......................... F01P 7/14 137/468 |
| 2011/0018209 | A1 | * | 1/2011 | Dahlhaus-Preussler D06F 37/00 277/562 |

FOREIGN PATENT DOCUMENTS

| | | |
|---|---|---|
| KR | 2011-0047471 A | 5/2011 |
| KR | 10-2012-0032345 A | 4/2012 |
| KR | 2013-0012875 A | 2/2013 |
| KR | 10-2013-0061445 A | 6/2013 |

* cited by examiner

RELATED ART

[shape of existing PTFE seal]

VALVE FOR CONTROLLING COOLANT FUEL CELL STACK COOLANT OF FUEL CELL VEHICLE

CROSS-REFERENCE TO RELATED APPLICATION

This application claims under 35 U.S.C. §119(a) the benefit of Korean Patent Application 10-2013-0167030 filed Dec. 30, 2013, the entire contents of which are incorporated herein by reference.

BACKGROUND (a) Technical Field

The present invention relates to a coolant control valve for a fuel cell stack in fuel cell vehicles, and more particularly, to a valve for controlling the temperature of a coolant to flow into a fuel cell stack at an optimum level in order to keep operation of the fuel cell stack stable.

(b) Background Art

In general, a fuel cell stack, being the main power supplier in a fuel cell vehicle, is a device which generates power using, an oxidant (e.g., oxygen in the air) and a reactant (e.g., hydrogen as a fuel). Because a fuel cell stack stably provides an optimum output when a coolant at the optimum temperature flows in the stack, it is very important to keep the coolant, being flowed into the stack at the optimum temperature.

The fuel cell stack usually generates a small amount of heat at the initial stages of fuel cell system. Therefore, when its temperature is low (i.e., below a specification defined value) a coolant flows along a loop of stack to a pump through a coolant control valve and into the stack. As the amount of heat generated by the stack increases and the temperature of the coolant increases over time, the coolant control valve appropriately closes off the bypass loop so that the coolant can flow through another loop from the stack to the pump then through the radiator and the coolant control valve consecutively and then back into the stack.

Considering that the required temperature of a coolant at the inlet of a stack in fuel cell vehicles is about 65° C., a coolant control valve can suitably control the amount that is allowed through each of the loops in response to a signal associated with the inlet temperature of the stack and allows a coolant to flow into the stack, at a constant temperature regardless of the external environment.

A variety of fuel cell systems equipped with a coolant control valve have been proposed in the related art, for example, in Korean Patent Application Publication No. 10-2013-0061445, Korean Patent Application Publication No. 10-2012-0032345, and Korean Patent Application Publication No. 10-2009-0058095.

FIG. 4 is a schematic view showing a coolant control valve for a fuel cell stack in a fuel cell vehicle of the related art. As shown in FIG. 4, the coolant control valve includes a body housing 11 with ports 10a, 10b, and 10c connected to a fuel cell stack, a pump, and a radiator, respectively, a plunger 12 and a plunger shaft 13 disposed in the body housing 11 and selectively opening/closing the ports 10a, 10b, and 10c, an actuator (not shown) disposed in an actuator housing 14 at a side of the plunger 12 and actuating the plunger 12, and a controller 15 controlling the operation of the actuator.

The plunger 12 is rotated by the operation force transmitted through the plunger shaft 13 from the actuator and is operated similarly to that of the related art. Thus, a detailed description of its operation is not provided.

FIGS. 5 and 6 are a perspective view and a cross-sectional view showing parts for sealing the plunger shaft of the coolant control valve for a fuel cell stack in a fuel cell vehicle of the related art. As shown in FIGS. 5 and 6, a aperture 16 through which the plunger shaft is disposed is formed in the actuator housing 14, and a seal 17, a seal washer 18, and a snap ring 19 are sequentially disposed around the plunger shaft 13 in the aperture 16, such that the portion where the plunger shaft is assembled is sealed. In particular, the seal 17 seals the portion in close contact with the circumferential surface of the plunger shaft 13, using a shaft sealing portion 21 that is pushed inward by a tension spring 20 inside the seal 17.

In the coolant control valves for the stacks in most fuel cell vehicles, it is very important to seal the plunger shaft in order to prevent water from flowing into the actuator controller. This is because sealing is directly linked to the components durability under the conditions (e.g., intense cold, intense heat, and large vibration, etc.) in which vehicles are often operated.

However, the sealing of a plunger shaft of the related art is problematic in that water leaks around the shaft within about three to six months of use due to these intense conditions that are generated while vehicles are in motion. For example, water leaks around a plunger shaft due to vapor flowing inside through the contact portion of the plunger shaft and a seal. Additionally, condensation is generated as a result of this vapor in an actuator controller. As such, there is a need to remedy these problems.

Accordingly, the defects of the sealing of a plunger shaft of the related art are as follows. First, the sealing surface of the seal is made of polytetrafluoroethylene (PTFE), so it is vulnerable to heat and cold over time. Second, the plunger shaft is vulnerable to water leakage due to vibration. This is because the restoring ability is low due to the nature of plastic. Third, the sealing ability is reduced due to an increase in wear when pressure is applied, and water leaks through accordingly. Fourth, current shafts are costly to manufacture because they are made up of many parts (e.g., a seal, a seal washer, a snap ring, etc.) required for sealing the plunger shaft.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to provide a coolant control valve for a fuel cell stack in a fuel cell vehicle which can prevent water leakage and has improved reliability in durability by implementing a new type of sealing that can achieve complete sealing with minimized friction force on a plunger shaft by changing the shape and structure of a seal for sealing the plunger shaft.

Further, the present invention provides a coolant control valve for a fuel cell stack in a fuel cell vehicle which can reduce the manufacturing cost via reduction of the number of parts and simplification of the structure. This is accomplished by removing peripheral parts while at the same time provide a proper seal.

In order to achieve the objects, a coolant control valve for a fuel cell stack in a fuel cell vehicle provided by the present invention has the following features.

The coolant control valve for a fuel cell stack in a fuel cell vehicle includes: a plunger and a plunger shaft selectively opening ports of a body housing which are connected to a fuel cell stack, a pump, and a radiator, respectively. A seal is disposed around the plunger shaft, in a aperture of an actuator housing through which the plunger shaft is disposed, and a space with a side open is defined inside the seal so that a shaft sealing portion being in close contact with the plunger shaft can be pressed to the plunger shaft by pressure of a coolant flowing in the space.

A metal insert may be inserted outside the inner wall of the space of the seal and a tension spring elastically supporting the shaft sealing portion in close contact with the rear side of the shaft sealing portion may also be disposed on the inner wall of the space of the seal.

A dust lip is configured to prevent external foreign substances from flowing inside in close contact with the circumferential surface of the plunger shaft may be formed along a side portion of the shaft sealing portion on the inner side of the seal.

Preferably, the seal may be made of fluororubber (FKM) with increased durabilty and excellent heat resistance and cold resistance.

The coolant control valve for a fuel cell stack in a fuel cell vehicle provided by the present invention has the following advantages. First, it is possible to increase reliability of durability of the coolant control valve, using the technology of improving a seal mounting structure. For example, the restoring force of the surface of a seal is high against vibration of a vehicle, such that it is strong against water leakage due to shaking of a shaft and shock or external shock.

Further, it improves water leakage due to wear and is strong against intense environment conditions (intense cold and intense heat) by replacing the material of a seal with FKM.

Further, mass production is difficult because there is a need of total measurement due to differences in quality caused by machining variation of products, in the specifications of the existing sealing, whereas mass production is possible because of little difference in quality and considerably low leak possibility, in the sealing specification of the present invention.

Second, it is possible to begin home production of sealing assembly structure and reduce the manufacturing cost with simplification of the structure. For example, since peripheral parts such as a seal washer and a snap ring for mounting a seal can be removed, the manufacturing cost can be reduced.

That is, in the existing sealing specification, assistant parts (e.g., the seal washer and snap ring) are needed because the seal may become separated during fitting, due to low elasticity of PTFE, but according to the sealing specifications of the present invention, the seal is firmly fixed during fitting because of high elasticity of FKM so that assistant parts (seal washer and snap ring) can be removed.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
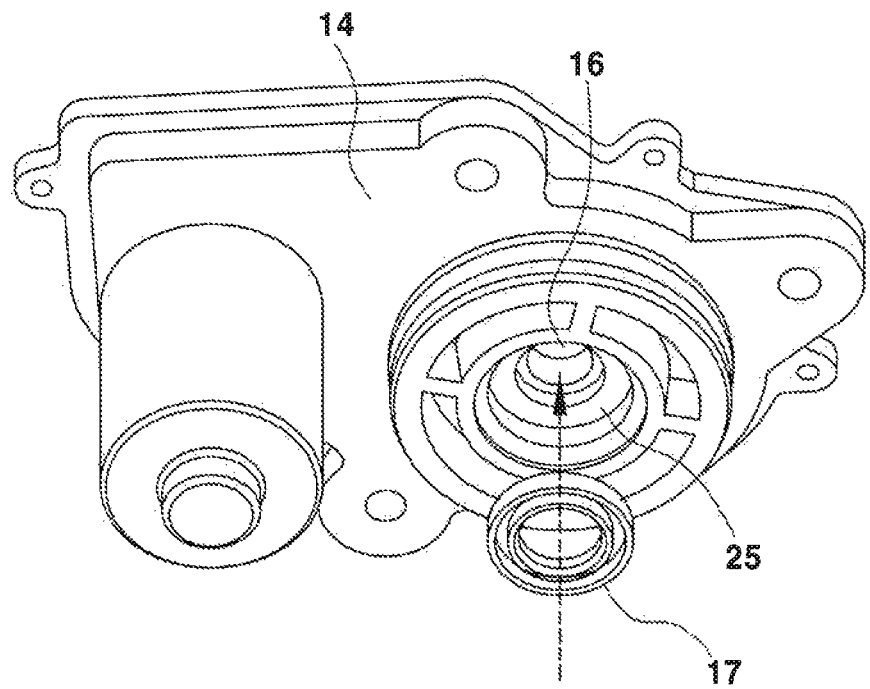
FIG. 1 is a perspective view showing an actuator housing and a seal for sealing a plunger shaft of a coolant control valve for a fuel cell stack in a fuel cell vehicle according to an exemplary embodiment of the present invention.

| 12: plunger | 13: plunger shaft |
|---|---|
| 14: actuator housing | 16: aperture |
| 17: seal | 18: seal washer |
| 19: snap ring | 20: tension spring |
| 21: shaft sealing portion | 22: space |
| 23: metal insert | 24: dust lip |
| 25: seal seat | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

EXAMPLES

Hereinafter, the present invention is described in detail with reference to the accompanying drawings.

Figure 4:
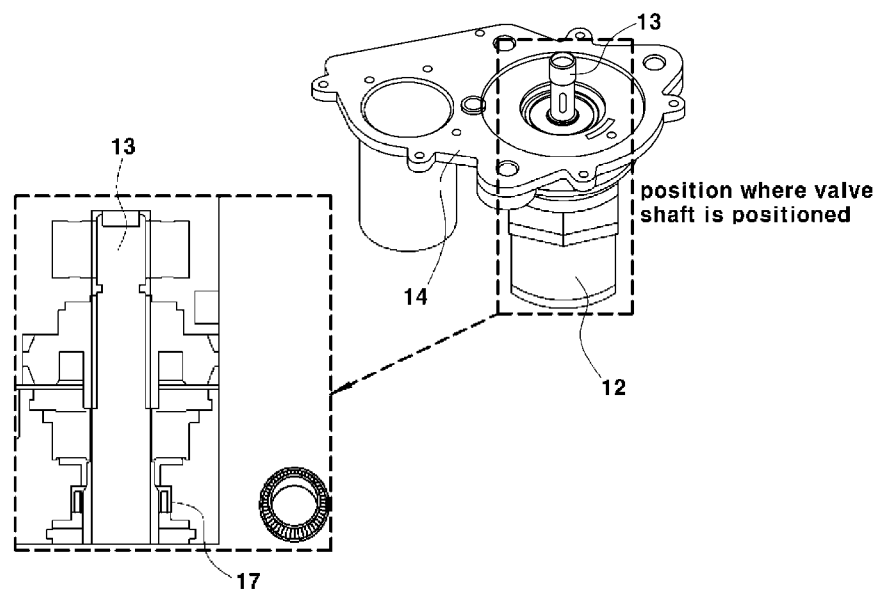
FIG. 4 is a schematic view showing a coolant control valve for a fuel cell stack in a fuel cell vehicle of the related art.
Figure 5:
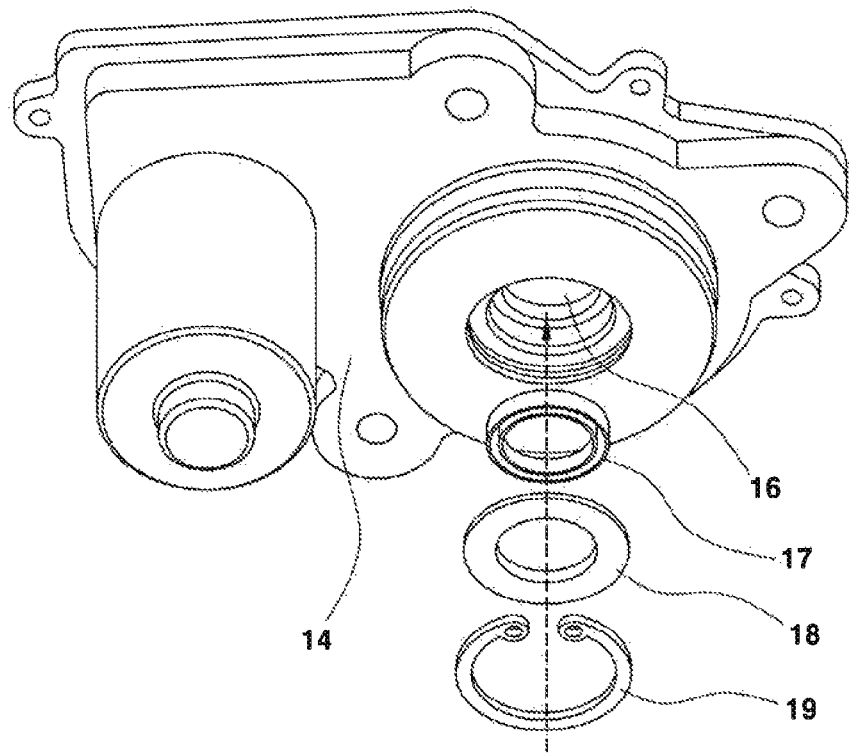
FIG. 5 is a perspective view showing parts for sealing the plunger shaft of the coolant control valve for a fuel cell stack in a fuel cell vehicle of the related art.
Figure 6:
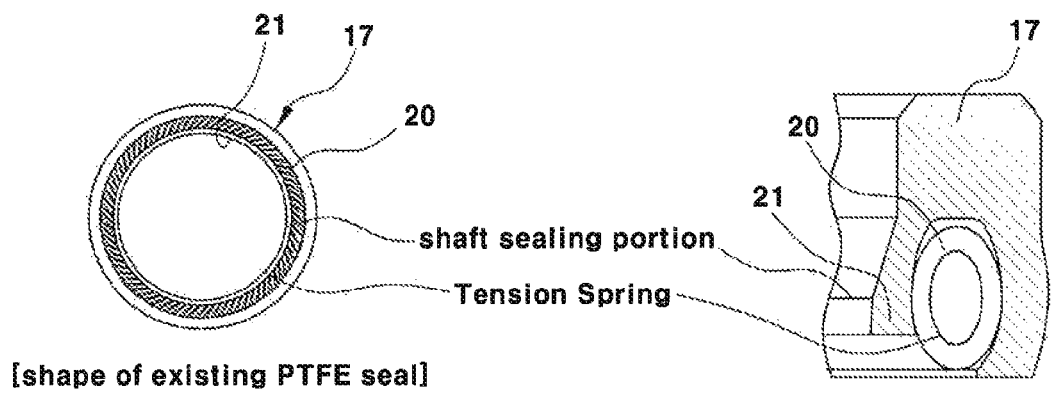
FIG. 6 is a perspective view and a cross-sectional view showing a seal in the coolant control valve for a fuel cell stack in a fuel cell vehicle of the related art.

The basic structure of a coolant control valve is described first with reference to FIG. 4. The coolant control valve of the present invention includes body housing (not shown) with ports (not shown) connected to a stack, a pump, and a radiator, respectively, a plunger 12 and a plunger shaft 13 disposed in the body housing 11 and selectively opening/ closing the ports, an actuator (not shown) disposed in an actuator housing 14 at a side of the plunger 12 and actuating the plunger 12, and a controller (not shown) controlling the actuator.

The power transmitted from the actuator to the plunger shaft and the plunger by rotation of the plunger shaft is the same as that of the related art and therefore the detailed description is not provided.

In particular, the coolant control valve of the present invention has a structure that can prevent water leakage due to shaking of the shaft while at the same time insuring durability against shock and increased restoration force of the seal surface by disposing a seal, which is made of rubber and has predetermined shape and function, in a shaft-through portion of the actuator housing 14.

Figure 2:
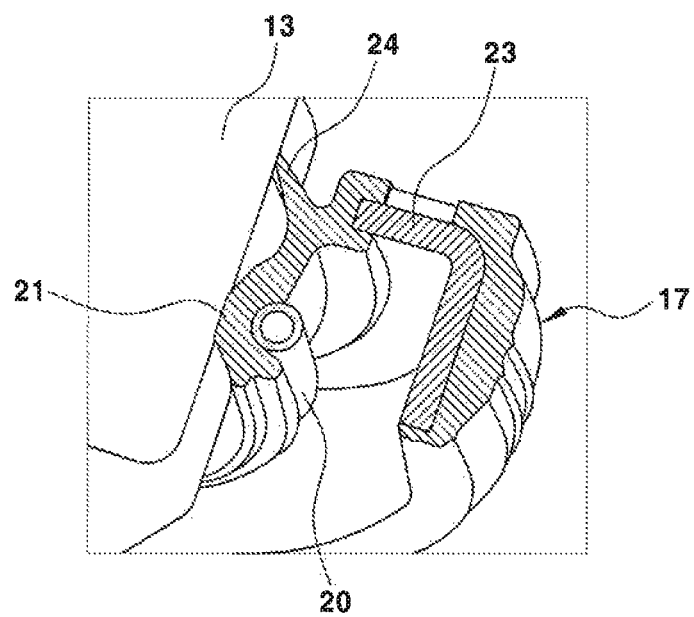
FIG. 2 is a perspective view showing the seal in the coolant control valve for a fuel cell stack in a fuel cell vehicle according to an exemplary embodiment of the present invention.

To this end, as shown in FIGS. 1 and 2, the body housing with the ports connected to the fuel cell stack, the pump, and the radiator, respectively is provided. The plunger 12 selectively opening/closing the ports is disposed in the body housing and the plunger shaft 13 protrudes up through the body housing. The plunger 12 and the plunger shaft 13 are rotatably supported through the actuator housing 14 having a cylindrical housing portion for installing the actuator (not shown) at a side of the plunger 12 and the plunger shaft 13.

An aperture 16 through which the shaft is disposed is formed in the actuator housing 14 and a groove-shaped seal seat 25 is formed around the aperture 16, in which a seal 17 to be described below can be seated. The seal 17 is formed in the shape of ring with a shaft-through aperture at the center and is seated in the seal seat 15 of the actuator housing 14, thereby allowing a sealing structure to come in close contact with the circumferential surface of the plunger shaft 13.

The seal 17 can effectively prevent vapor or moisture from under it, for example, vapor or moisture flowing up into the body housing with the plunger 12 therein from flowing into the controller (15 in FIG. 4) along the plunger shaft 13. To this end, a space 22 with the bottom open to the coolant in the body housing is defined inside the seal 22, such that the coolant flowing through the body housing fills the space 22 of the seal and can apply pressure.

That is, the shaft sealing portion 21 being in close contact with the plunger shaft 13 is pressed to the plunger shaft 13 by the pressure of the coolant in the space 22 of the seal 17 so that the shaft sealing portion 21 can be in a closer contact. The inside of the space 22 of the seal 17 is formed in a reverse L-shape, in which a metal insert 23 covering the top and the outer wall of the space 22 is inserted.

The metal insert 23 allows the coolant pressure exerted in the space 22 to be applied to the inner wall where the shaft sealing portion 21 is rather than the outer wall, other than the force required to maintain the basic structure of the seal 17. The metal insert 23 may be integrally formed by being inserted together when the seal is formed.

Also, a ring-shaped tension spring 20 may be disposed on the inner wall of the space 22 of the seal 17 and be configured to squeeze the rear side to the shaft sealing portion 21 in close contact with ring shaped tension spring 20. In particular, the shaft sealing portion 21 can be more firmly in contact with the circumferential surface of the plunger shaft 13 due to the tension spring 20 elastically supporting it. A restoring force can be provided to the shaft sealing portion 21 when vibration etc. is applied.

A dust lip 24 in close contact with the circumferential surface of the plunger shaft 13 may be integrally formed at a side of the shaft sealing portion 21 on the inner side of the seal 17, for example, above the shaft sealing portion 21, close to the upper space where the controller 15 is disposed. As such, the dust lip 24 prevents foreign substances such as dust can be prevented from flowing into the space where the controller 15 is disposed.

The seal may be made of, for example, FKM or EPDM, and accordingly, it can improve water leakage due to wear and achieved excellent sealing such as cold resistance and heat resistance under intense environment conditions.

Accordingly, the sealing operation of the coolant control valve having this configuration is as follows.

Figure 3:
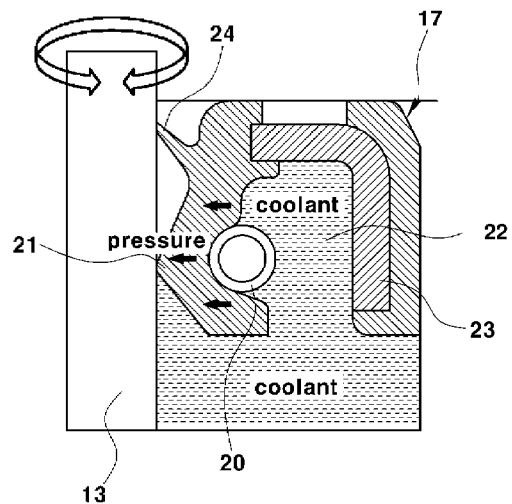
FIG. 3 is a cross-sectional view showing the sealing operation of the seal in the coolant control valve for a fuel cell stack in a fuel cell vehicle according to an exemplary embodiment of the present invention.

FIG. 3 is a cross-sectional view showing the sealing operation of the seal in the coolant control valve for a fuel cell stack in a fuel cell vehicle according to an embodiment of the present invention. As shown in FIG. 3, the seal 17 is disposed around the plunger shaft 13 that actuates the plunger selectively opening/closing the ports connected to the stack, the pump, and the radiator, respectively, in operation of a fuel cell stack, and the shaft sealing portion 21 inside the seal 17 can achieve sealing in close contact with the circumferential surface of the plunger shaft 13.

The shaft sealing portion 21 of the seal 17 can provide firm sealing in close contact with the plunger shaft 13 via the force applied by the tension spring 20 on the rear side. In particular, the space 22 of the seal 17 may be filled with the coolant flowing through the body housing and the coolant in the space applies pressure inward toward the inner wall of the space where the shaft sealing portion 21 is positioned, in the direction of the arrows, such that the shaft sealing portion 21 can be in close contact with the circumferential surface of the plunger shaft 13 under the pressure from the coolant and a complete hermetic structure is achieved accordingly.

Since a new sealing structure with the seal of which the shape and structure are improved is implemented in the present invention, as described above, the following advantages can be obtained.

First, since the sealing side is made of a material that wears well such as FKM, the seal has excellent heat resistance and cold resistance.

Second, as for the eccentricity compliance (i.e., the seals ability to correct the sealing side when the central axis of a shaft is shaken by operation of a motor), shaking of the shaft can be compensated for by the elasticity of rubber, so it is possible to prevent water leakage due to leaks.

Third, as for resistance against pressure, when pressure is generated, the sealing resistance increases, and the higher the coolant pressure, the stronger the seal is.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A coolant control valve for a fuel cell stack in a fuel cell vehicle, comprising:
   a body housing;
   a plunger and a plunger shaft selectively opening ports of the body housing which are connected to a fuel cell stack, a pump, and a radiator, respectively;
   a seal disposed around the plunger shaft, in an aperture of an actuator housing through which the plunger shaft is disposed; and
   a space with a side open defined by an inside portion of the seal so that a shaft sealing portion in close contact with the plunger shaft is pressed against the plunger shaft by pressure of a coolant flowing within the space, wherein a metal insert is inserted outside an inner wall of the space of the seal and is exposed towards the space filled with the coolant.

2. The coolant control valve of claim 1, wherein a tension spring elastically supporting the shaft sealing portion in close contact with the rear side of the shaft sealing portion is disposed on an inner wall of the space within the seal.

3. The coolant control valve of claim 1, further comprising a dust lip that prevents external foreign substances from flowing along a circumferential surface of the plunger shaft is formed at a side of the shaft sealing portion on the inner side of the seal.

4. The coolant control valve of claim 1, wherein the seal is made of fluororubber.

5. A coolant control valve for a fuel cell stack in a fuel cell vehicle, comprising:
   a body housing;
   a plunger and a plunger shaft selectively opening ports of the body housing which are connected to a fuel cell stack, a pump, and a radiator, respectively;
   a seal disposed around the plunger shaft, in a aperture of an actuator housing through which the plunger shaft is disposed, the seal including a first shaft sealing portion and a second shaft sealing portion separated from the first shaft sealing portion;
   a space with a side open defined by an inside portion of the seal so that the first shaft sealing portion in close contact with the plunger shaft is pressed against the plunger shaft by pressure of a coolant flowing within the space; and
   a metal insert covering a top of the space and an inner wall of the space of the second shaft sealing portion of the seal,
   wherein the first shaft sealing portion and the second shaft sealing portion are connected to each other by the metal insert at the top of the space; and
   wherein the metal insert is exposed towards the space filled with the coolant.

\* \* \* \* \*